(12) United States Patent
Song et al.

(10) Patent No.: US 7,920,242 B2
(45) Date of Patent: Apr. 5, 2011

(54) ARRAY SUBSTRATE FOR LCD

(75) Inventors: Young-Goo Song, Suwon-si (KR);
Hyang-Shik Kong, Suwon-si (KR);
Sung-Man Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 10/565,837

(22) PCT Filed: Jun. 11, 2004

(86) PCT No.: PCT/KR2004/001395
§ 371 (c)(1),
(2), (4) Date: Jan. 25, 2006

(87) PCT Pub. No.: WO2005/010602
PCT Pub. Date: Feb. 3, 2005

(65) Prior Publication Data
US 2006/0203175 A1    Sep. 14, 2006

(30) Foreign Application Priority Data

Jul. 25, 2003 (KR) .................. 10-2003-0051560

(51) Int. Cl.
*G02F 1/1339* (2006.01)
(52) U.S. Cl. .................... 349/153; 349/190; 349/138
(58) Field of Classification Search .............. 349/153, 349/190
See application file for complete search history.

(56) References Cited

U.S. PATENT DOCUMENTS

| 6,822,717 B2 * | 11/2004 | Seo et al. ................ 349/141 |
| 6,859,254 B2 * | 2/2005 | Kim et al. ................ 349/190 |
| 6,862,069 B2 * | 3/2005 | Kwak et al. .............. 349/143 |
| 2001/0013918 A1 | 8/2001 | Kwak et al. |
| 2003/0122983 A1 | 7/2003 | Kim et al. |
| 2004/0036815 A1 * | 2/2004 | Kim et al. ................ 349/38 |

FOREIGN PATENT DOCUMENTS

| JP | 09-033933 | 2/1997 |
| JP | 09-033933 A | 2/1997 |
| KR | 1020030058772 A | 7/2003 |

OTHER PUBLICATIONS

Patent Abstracts of Japan, Publication No. 09-033933, Feb. 7, 1997, 1 page.

* cited by examiner

*Primary Examiner* — Richard H Kim
(74) *Attorney, Agent, or Firm* — Innovation Counsel LLP

(57) ABSTRACT

An array substrate (100*a*) includes a transparent substrate (304), a first insulation layer (306) and a pixel electrode (103). The transparent substrate (304) includes a display region (DR) that displays an image, a peripheral region (PR) having a driving circuit (101) for displaying an image through the display region, and a sealine region (SLR) that surrounds the display region (DR) to define the display region and the peripheral region (PR). The first insulation layer (306) is formed over the transparent substrate (304), and the first insulation layer (306) has an opening window (301) in the sealine region (SLR). The pixel electrode (103) is formed on the first insulation layer (306) of the display region (DR). The bonding between a color filter substrate (401) and an array substrate (100*a*) is improved. Furthermore, liquid crystal material is completely filled into between the color filter substrate and the array substrate.

21 Claims, 7 Drawing Sheets

ARRAY SUBSTRATE FOR LCD

TECHNICAL FIELD

The present invention relates to an array substrate, a method of manufacturing the array substrate, a liquid crystal display apparatus having the array substrate and a method of manufacturing the liquid crystal display apparatus. More particularly, the present invention relates to an array substrate for a strong bonding with a color filter substrate, a method of manufacturing the array substrate, a liquid crystal display apparatus having the array substrate and a method of manufacturing the liquid crystal display apparatus.

BACKGROUND ART

Recently, a liquid crystal display apparatus is widely used, because the liquid crystal display apparatus has lightweight, thin thickness and low power consumption.

The liquid crystal display apparatus includes a liquid crystal display panel and a backlight assembly. The backlight assembly provides light to the liquid crystal display panel. The liquid crystal display panel includes a color filter substrate and an array substrate. The color filter substrate includes color filters through which the light having specific wavelengths may pass to display colored images. The color filter includes a common electrode. A reference voltage is applied to the common electrode.

The array substrate employs a thin film transistor as a switching device. The thin film transistor includes a gate electrode, a drain electrode and a source electrode. The gate electrode is electrically connected to a gate line. The drain electrode is electrically connected to a pixel electrode. The source line is electrically connected to a data line. When a gate voltage is applied to the gate line, the thin film transistor is turned on, so that a pixel voltage is applied to the pixel electrode via the thin film transistor.

A liquid crystal layer is interposed between the color filter substrate and the array substrate. When the pixel voltage is applied to the pixel electrode, electric fields are formed between the pixel electrode and the common electrode. The electric fields change the arrangement of the liquid crystal molecules of the liquid crystal layer to change the transmittance of light provided from the backlight assembly. Therefore, an image is displayed.

According to the conventional liquid crystal display apparatus, the data line does not overlap with the pixel electrode to avoid the increase in power consumption from the cross-talk due to the parasitic capacitance formed between the data line and the pixel electrode when the data line overlaps with the pixel electrode.

However, when the data line does not overlap with the pixel electrode, the distance between the pixel electrodes increases due to the data line that is disposed between the pixel electrodes. Therefore, aperture ratio is lowered. Furthermore, the light leakage between the data line and the pixel electrode causes lower luminance.

In order to avoid above-mentioned problems, an insulation layer is formed between the data line and the pixel electrode. Therefore, a portion of the data line may overlap with the pixel electrode to increase the aperture ratio.

The insulation layer has a low dielectric constant. Furthermore, when the insulation layer is formed, the distance between the data line and the pixel electrode increases. Therefore, even when a portion of the data line overlaps with the pixel electrode, a parasitic capacitance formed between the data line and the pixel electrode becomes negligibly small. Therefore, the insulation layer formed between the pixel electrode and the data line increases the aperture ratio and prevents the leakage of the light from the backlight assembly.

However, when the insulation layer is formed, the bonding strength between the sealant that combines the color filter substrate and the array substrate, and the insulation layer, or the bonding strength between the insulation layer and the gate insulation layer becomes fragile. Thus, a weak impact may separate the color filter substrate from the array substrate. Even though the color filter substrate is not completely separated from the array substrate, liquid crystal material is not completely injected into between the color filter substrate and the array substrate due to the crack formed between the sealant and the insulation layer or between the insulation layer and the gate insulation layer, which lowers the productivity.

DISCLOSURE OF INVENTION

Technical Problem

The present invention provides an array substrate for a strong bonding with a color filter substrate.

The present invention also provides a method of manufacturing the array substrate.

The present invention also provides a liquid crystal display apparatus having the array substrate.

The present invention also provides a method of manufacturing the liquid crystal display apparatus.

Technical Solution

In accordance with an exemplary array substrate of the present invention, the array substrate includes a transparent substrate, a first insulation layer and a pixel electrode. The transparent substrate includes a display region that displays an image, a peripheral region having a driving circuit for displaying an image through the display region, and a sealine region that surrounds the display region to define the display region and the peripheral region. The first insulation layer is formed over the transparent substrate, and the first insulation layer has an opening window in the sealine region. The pixel electrode is formed on the first insulation layer of the display region.

In accordance with an exemplary liquid crystal display apparatus, the liquid crystal display apparatus includes an array substrate, a color filter substrate, a liquid crystal layer and a sealing member. The array substrate includes a transparent substrate, a first insulation layer, and a pixel electrode. The transparent substrate has a display region that displays an image, a peripheral region having a driving circuit for displaying an image through the display region, and a sealine region that surrounds the display region to define the display region and the peripheral region. The first insulation layer is armed over the transparent substrate, and the first insulation layer has an opening window in the sealine region. The pixel electrode is formed on the first insulation layer of the display region. The color filter substrate faces the array substrate. The liquid crystal layer is interposed between the array substrate and the color filter substrate. The sealing member is formed at the opening window to combine the array substrate and the color filter substrate.

In accordance with an exemplary method of firming an array substrate, a first insulation layer is formed over the transparent substrate including a display region that displays an image, a peripheral region having a driving circuit for displaying an image through the display region, and a sealine region that surrounds the display region to define the display region and the peripheral region. A portion of the first insulation layer is removed to form an opening window in the sealine region. Then, a pixel electrode is formed on the first insulation layer of the display region.

In accordance with an exemplary method of forming a liquid crystal display apparatus, an array substrate including i) a transparent substrate including a display region that displays an image, a peripheral region having a driving circuit for displaying an image through the display region, and a sealine region that surrounds the display region to define the display region and the peripheral region, ii) a first insulation layer formed over the transparent substrate, the first insulation layer having an opening window in the sealine region, and iii) a pixel electrode formed on the first insulation layer of the display region is formed. A sealing member is formed at the opening window. A color filter substrate is attached to the sealing member to assemble the array substrate and the color filter substrate. Then, a liquid crystal layer is formed between the array substrate and the color filter substrate.

According to the present invention, the bonding of a color filter substrate and an array substrate is reinforced.

Furthermore, a liquid crystal material is completely filled in between the color filter substrate and the array substrate, which increases the productivity.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Figure 1:
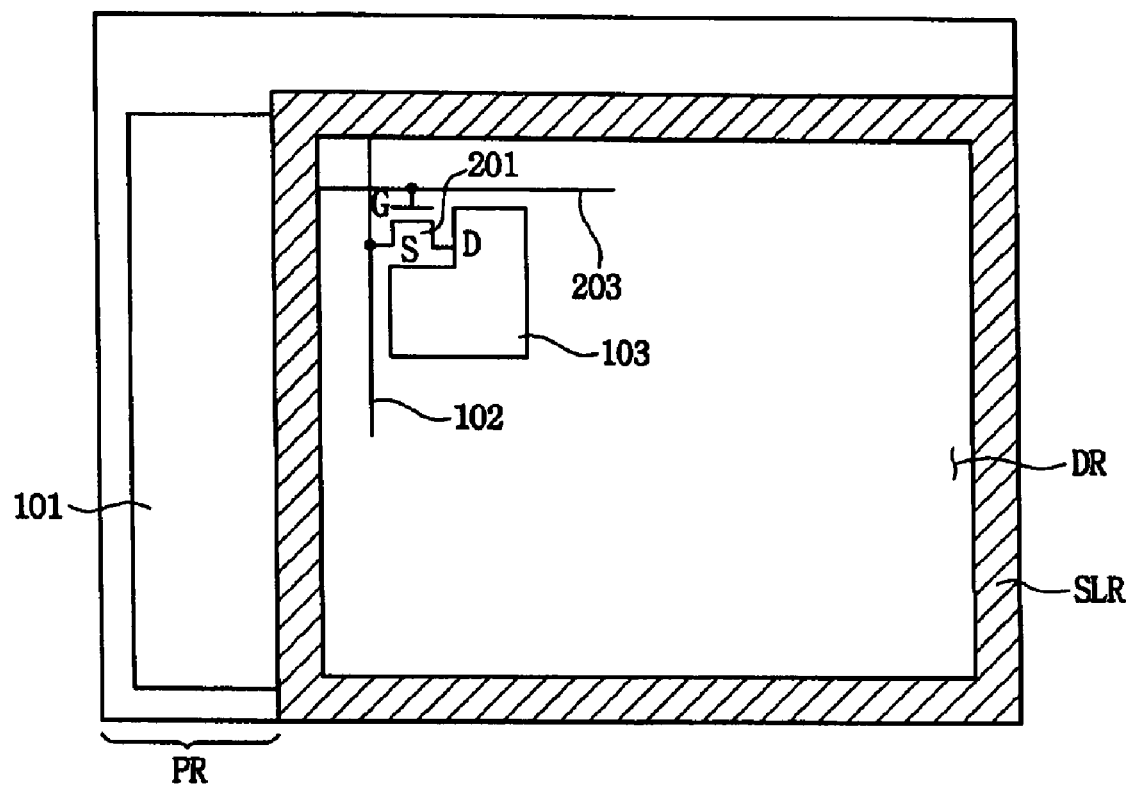
FIG. 1 is a schematic plan view showing an array substrate.

FIG. 1 is a schematic plan view showing an array substrate.

Referring to FIG. 1, an array substrate 100 includes a display region DR and a peripheral region PR. The display region DR displays an image, and the peripheral region includes a driving circuit, such as a gate driving circuit 101. A data driving circuit (not shown) is made in the form of separate chip, and the data driving circuit is electrically connected to the array substrate 100. The data driving circuit is also disposed on the peripheral region PR.

A sealine region SLR is disposed between the display region DR and the peripheral region PR, such that the sealine region SLR divides the display region DR and the peripheral region PR. A sealing member (not shown) for bonding the array substrate and a color filter substrate (not shown) is to be disposed on the sealine region SLR.

The display region DR includes a plurality of gate lines 203 arranged in parallel to each other, and a plurality of data lines 102 arranged perpendicular to the gate lines 203. The gate lines 203 and the data lines 102 are on different layers and are electrically insulated from each other.

Each of the data lines 102 and gate lines 203 defines a pixel. Each pixel includes a thin film transistor 201 and a pixel electrode 103.

The thin film transistor 201 includes a gate electrode G, a source electrode S and a drain electrode D. The gate electrode G is electrically connected to the gate line 203. The source electrode S is electrically connected to the data line 102. The drain electrode is electrically connected to the pixel electrode 103.

When a gate driving circuit (not shown) applies a gate driving voltage to the gate line 203, the thin film transistor 201 that is electrically connected to the gate line 203 is turned on. Then, a pixel voltage that is applied by a data driving circuit (not shown) is applied to the pixel electrode 103 via the thin film transistor 201.

Figure 2:
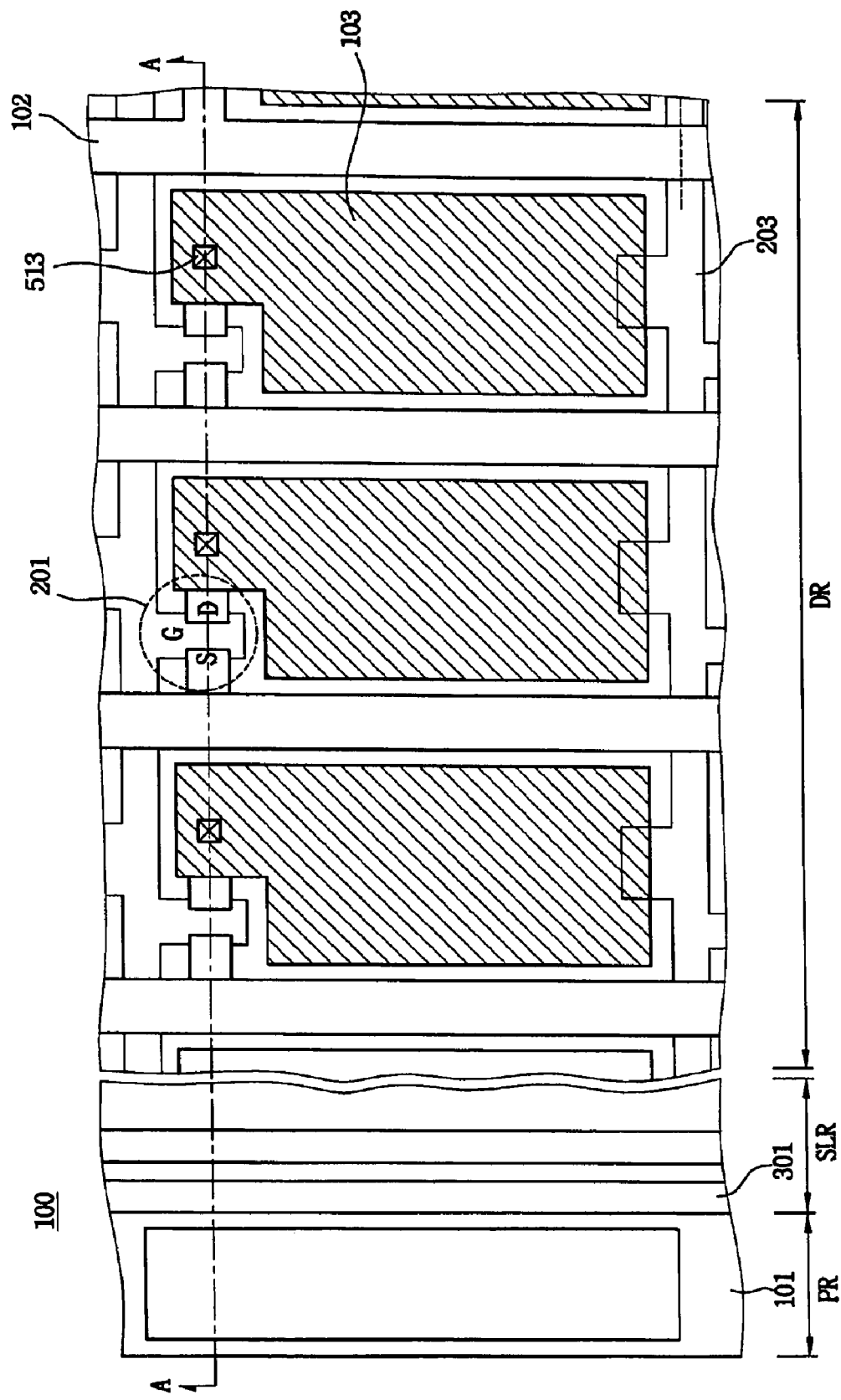
FIG. 2 is a schematic layout showing an array substrate.

FIG. 2 is a schematic layout showing an array substrate.

Referring to FIG. 2, a plurality of gate lines 203 and a plurality of data lines 102 are formed on different layers of a display region DR of an array substrate 100. A pixel electrode 103 is electrically connected to a thin film transistor 201 via a contact hole 513. A portion of the gate line 203 protrudes to form a gate electrode G of a thin film transistor 201. A gate insulation layer (not shown) is formed on the gate electrode G. An amorphous silicon layer (not shown) and n+amorphous silicon layer are formed on the gate insulation layer, in sequence. Then, a drain electrode D and a source electrode S are formed on the gate n+ amorphous silicon layer.

A gate driving circuit 101 is formed in a peripheral region PR. A sealine region SLR is interposed between the peripheral region PR and display region DR.

The sealine region SLR includes an opening window 301. A sealant that combines the array substrate 100 and a color filter substrate may be tightly attached to the sealine region SLR by the opening window 301. That is, the bonding strength of the insulation layer (not shown) firmed on the array substrate 100 and the sealant is low. Therefore, the insulation layer is removed to form the opening window 301. Then, the sealant is formed on the opening window 301. When the sealant is attached on the opening window 301, a contact area of the sealant increases, and the sealant makes contact with not only the insulation layer but also other layers to strengthen the bonding between the sealant and the array substrate 100.

Therefore, as long as the opening window 301 opens the insulation layer to increase the contact area, the shape of the opening window 301 is not limited. As an example, in FIG. 2, the opening window 301 extends in a longitudinal direction of the region SLR. The shape of the opening window 301, however, and the number of the opening windows are not limited.

Figure 3:
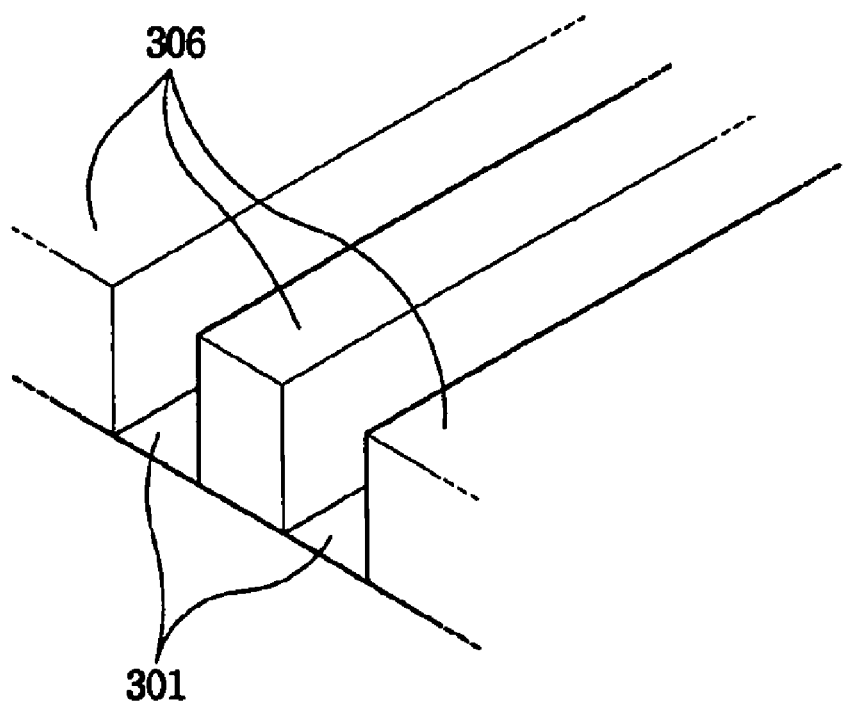
FIGS. 3 and 4 are schematic perspective view showing exemplary opening windows formed on an insulation layer of FIG. 2.
Figure 4:
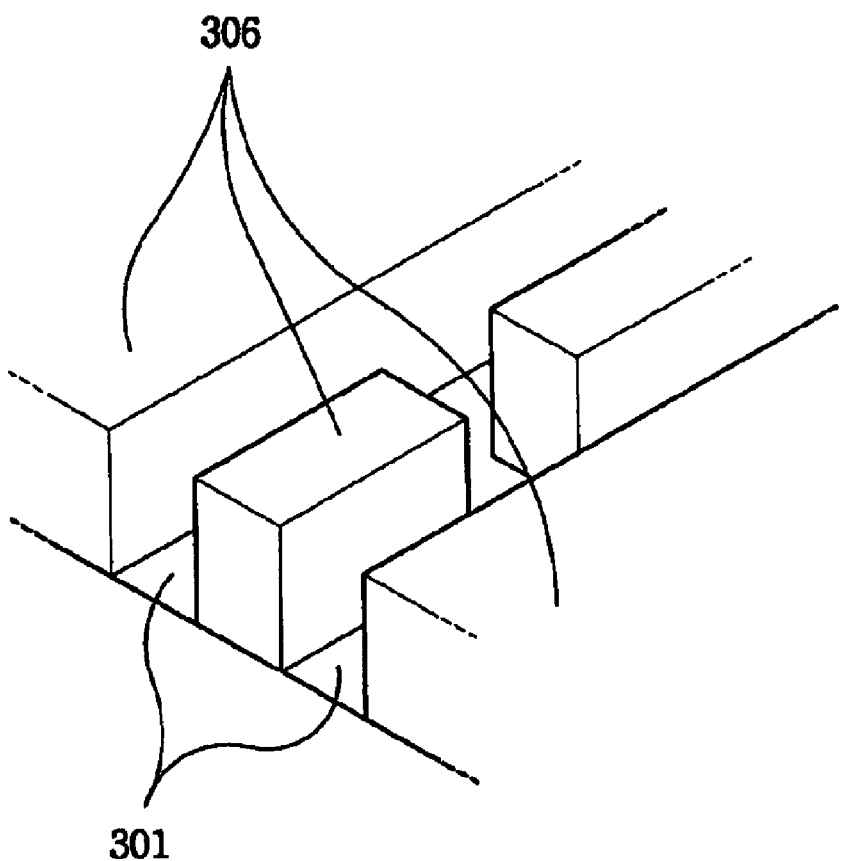

FIGS. 3 and 4 are schematic perspective views showing exemplary opening windows formed on an insulation layer of FIG. 2.

Referring to FIGS. 3 and 4, a portion of an insulation layer 306 is removed to form an opening window 301. The opening window 301 extends in a longitudinal direction of a sealine. The shape, the size and the number of the opening window 301 in FIGS. 3 and 4 do not limit the scope of this invention.

Figure 5:
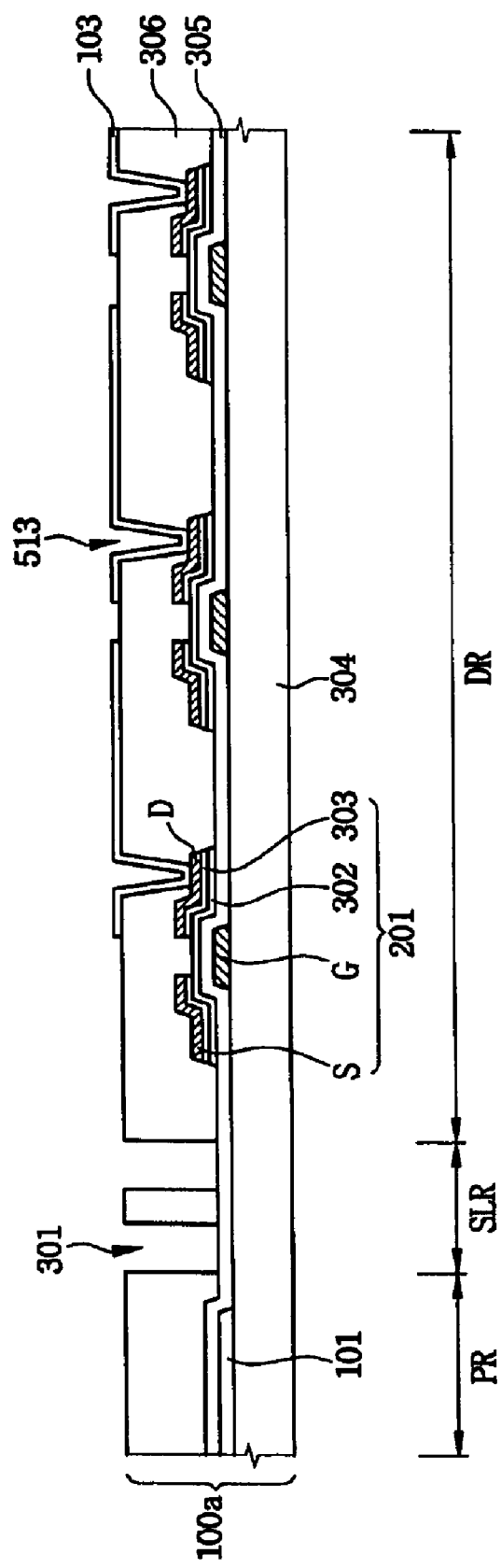
FIG. 5 is a cross-sectional view taken along a line A-A' of FIG. 2 according to a first exemplary embodiment of the present invention.
Figure 6:
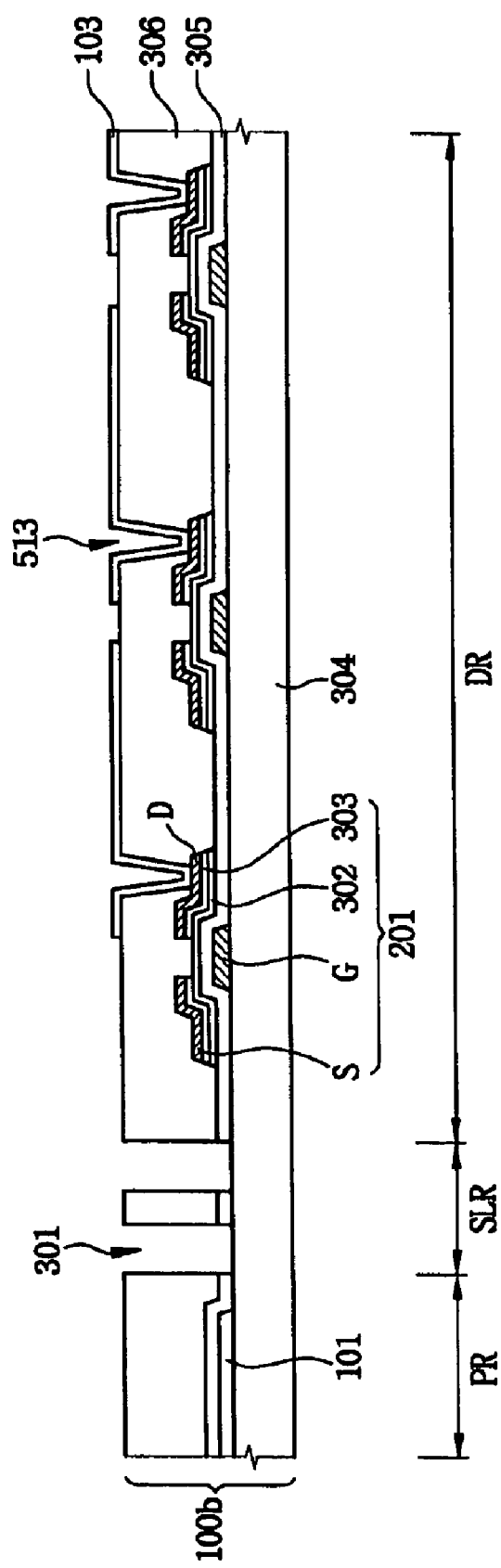
FIG. 6 is a cross-sectional view taken along a line A-A' of FIG. 2 according to a second exemplary embodiment of the present invention.

FIG. 5 is a cross-sectional view taken along a line A-A' of FIG. 2 according to a first exemplary embodiment of the present invention, and FIG. 6 is a cross-sectional view taken along a line A-A' of FIG. 2 according to a second exemplary embodiment of the present invention.

Referring to FIGS. 5 and 6, array substrates 100a and 100b of FIGS. 5 and 6, respectively, include a first transparent substrate 304, a thin film transistor 201, an insulation layer 306 and a pixel electrode 103.

The first transparent substrate 304 includes a display region DR, a peripheral region PR and a sealine region SLR that divides the display region DR and the peripheral region PR.

The display region DR displays an image, and the peripheral region PR includes driving circuits for displaying an image. A sealant that combines the array substrates 100a and 100b with a color filter substrate is to be disposed in the sealine region SLR.

The display region DR of the transparent substrate 304 includes a plurality of gate electrodes G. A gate insulation layer 305 is formed on the first transparent substrate 304, such that the gate insulation layer 305 covers the gate electrode G. A source electrode S and a drain electrode D are formed over the gate insulation layer 305. An insulation layer 306 is formed thereon. The insulation layer 306 includes an opening window 301 and a contact hole 513. The opening window 301 is formed in the sealine region SLR. The contact hole 513 exposes drain electrode D. A pixel electrode 103 formed on the insulation layer 306 is electrically connected to the drain electrode D via the contact hole 513.

Hereinafter, a method of manufacturing the array substrate will be explained.

Aluminum neodymium (Al—Nd) alloy is deposited on the first transparent substrate 304 to form a layer. The layer comprising aluminum neodymium (Al—Nd) alloy is patterned via a photolithography process and etched to form a gate electrode G.

When the gate electrode G is formed, a gate insulation layer (or a second insulation layer) 305 is formed, such that the gate insulation layer covers the gate electrode G. The gate insulation layer comprises silicon nitride (SiNx).

An amorphous silicon layer 302 is formed on a portion of the gate insulation layer 305, which is near the gate electrode G.

An n+ amorphous silicon layer 303 is formed on the amorphous silicon layer 302.

The gate insulation layer 305 has a high resistivity at a low temperature, so that the carriers of the amorphous silicon layer, when a voltage is applied to the gate electrode, do not leak but gather together at an interface between the amorphous silicon layer 302 and n+ amorphous silicon layer 303 to form a channel layer.

The amorphous silicon layer 302 has a resistivity ranging from about $10^{11}$ $\Omega cm^{-1}$ to about $10^{12}$ $\Omega cm^{-1}$. When a gate voltage is applied to the gate electrode G, the resistivity of the amorphous silicon layer 302 is lowered to be $10^5$ $\Omega cm^{-1}$ to about $10^6$ $\Omega cm^{-1}$. Therefore, current may pass through the amorphous silicon layer.

The n+ amorphous silicon layer 303 reduces a contact resistance between a metal of the source electrode S and the drain electrode D, and the amorphous silicon layer 302, and the n+ amorphous silicon layer 303 reduces leakage current. Phosphorus (P) atoms are doped to form the n+ amorphous silicon layer 303.

Then, the drain and source electrodes D and S are firmed on the n+ amorphous silicon layer 303. The drain and source electrodes D and S comprise chromium.

A gate driving circuit 101 is in the peripheral region PR of the first transparent substrate 304. A data driving circuit (not shown) may be made in the form of a separate chip, and the chip is disposed in the peripheral region PR.

After the drain and source electrodes D and S are formed, an insulation layer (or a first insulation layer 306) is formed. The insulation layer 306 increases aperture ratio and luminance. The insulation layer 306 also includes a material capable of being patterned by a photolithography process.

The opening window 301 is formed in the sealine region SLR, and the opening window 301 penetrates the insulation layer 306. The opening window 301 may penetrate only the insulation layer 306 to expose the gate insulation layer 305 as shown in FIG. 5, or the opening window 306 may penetrate both the insulation layer 306 and the gate insulation layer 305 to expose the first transparent substrate 304 as shown in FIG. 5.

The opening window 301 may be formed by dry etching. When the opening window 301 is formed, a sealant (not shown) is attached on the array substrates 100a and 100b more tightly.

A contact hole 513 for exposing the drain electrode is formed at the insulation layer 306. The contact hole 513 and the opening window 301 may be formed via a same process or different processes.

A layer comprising an optically transparent and electrically conductive material, for example, such as indium tin oxide (ITO), indium zinc oxide (IZO), etc. is formed on the insulation layer 306, and the layer is patterned to form the pixel electrode 103.

The indium tin oxide and the indium zinc oxide materials have excellent conductivity and are also chemically and thermally stable.

Figure 7:
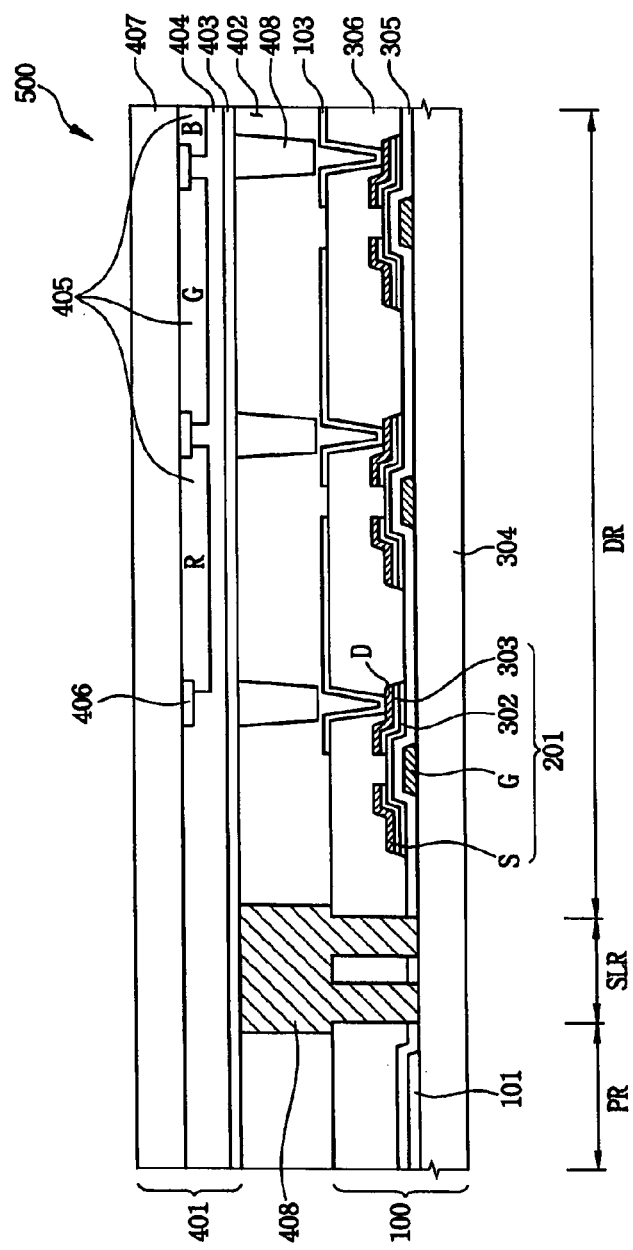
FIG. 7 is a schematic cross-sectional view showing a liquid crystal display apparatus according to a third exemplary embodiment of the present invention.

FIG. 7 is a schematic cross-sectional view showing a liquid crystal display apparatus according to a third exemplary embodiment of the present invention.

Referring to FIG. 7, a liquid crystal display apparatus according to a third exemplary embodiment of the present invention includes a color filter substrate 401, an array substrate 100 and a liquid crystal layer 402 interposed between the color filter substrate 401 and the array substrate 100.

The color filter substrate 401 includes a second transparent substrate 407, a color filter 405, a leveling layer 404, a common electrode 403 and a black matrix 406.

The black matrix 406 and the color filter 405 are formed on the second transparent substrate 407. The leveling layer 404 covers the black matrix 406 and the color filter 405. The common electrode 403 is formed on the leveling layer 404.

The color filter 405 includes a red color filter R, a green color filter G and a blue color filter B. When a light passes through the red, green and blue color filters R, G and B, the light is filtered to display a red, green and blue light, respectively.

A liquid crystal display apparatus is classified into a stripe type, a mosaic type, a triangular type, etc. in accordance with an arrangement of the red, green and blue color filters. The stripe type is adequate for a monitor of a computer system, and the mosaic type and the triangular type are adequate for a television set.

The black matrix 406 covers the driving circuit firmed on the array substrate to prevent the driving circuit, etc. from being seen. The black matrix 406 comprises metal or organic material.

The leveling layer 404 protects the color filter 405, and increases the flatness by decreasing the height differences. The leveling layer 404 comprises acryl resin or polyimide resin.

The common electrode 403 comprises a material that is optically transparent and electrically conductive, for example, such as indium tin oxide (ITO), indium zinc oxide (IZO), etc.

Hereinafter, a method of forming the color filter substrate 401 will be explained.

The black matrix 406 is formed on the second transparent substrate 407. The black matrix 406 comprises metal or organic material.

A metal black matrix is classified into a chromium (Cr) black matrix, a double-layered chromium black matrix (Cr/CrOx) or a triple-layered chromium black matrix (Cr/CrNx/CrOx). An organic black matrix is divided into a carbon black type black matrix, an RGB pigment black matrix, a dye dispersion type black matrix, and an RGB overlapping type black matrix.

The color filter 405 is formed on the second transparent substrate 407. The color filter 405 includes a red color filter R, a green color filter G and a blue color filter B. The color filter 405 may be formed using dyes or pigments. A method of forming the color filter 405 using dyes is classified into a dyeing process and a dye dispersion process, and a method of arming the color filter 405 using pigments is classified into a pigment dispersion process, a printing process and an adhesion process.

In the dyeing process, acryl resin, casein, gelatin, etc. are used as coloring resins, and dye is used as a coloring matter. The dyeing process is adequate for a minute opening window, but the color filter 405 formed by the dyeing process has a low durability.

In the dye dispersion process, polyimide is used as the coloring resin, and dye is used as the coloring matter. The dye dispersion process is also adequate for a minute opening window, but the color filter 405 formed by the dye dispersion process has a low durability.

In the pigment dispersion process, acryl resin is used as the coloring resin, and pigments are used as the coloring matter. The color filters 405 formed by the pigment dispersion process have a good lightproof property and a good thermal stability. However, an oxygen preventing layer is additionally required.

In the printing process, epoxy resin is used as the coloring resin, and the pigments are used as the coloring matter. The color filters 405 armed by the printing process have a good lightproof property and a good thermal stability, but a bad resolution and flatness.

In the adhesion process, both the acryl resin and the epoxy resin are used as the coloring resin, and the pigments are used as the coloring matter. The color filters 405 formed by the adhesion process have a good lightproof property, a flatness and a good thermal stability, but the patterning is limited.

The dyeing process, the dye dispersion process and the pigment dispersion process are adequate for the stripe, mosaic and triangular type arrangements of the color filters. The printing process and the adhesion process are adequate for the stripe arrangement, but not for the mosaic, and triangular type arrangements.

The leveling layer 404 is formed on the black matrix 406 and the color filter 405. The leveling layer 404 comprises acryl resin or polyimide resin.

When the acryl resin is used for the leveling layer 404, the acryl resin is mixed with a hardener to form the leveling layer 404. The polyimide resin is expensive, but has good thermal stability.

When the leveling layer 404 is armed, a hardening process is performed.

Both the acryl resin and the polyimide resin are thermosetting plastic. Therefore, heat treatment is important. Additionally, when the hardening process is defectively performed, the common electrode 403 that is to be armed on the leveling layer 404 may be corrugated or fragile. Therefore, the leveling layer 404 is sufficiently hardened.

The common electrode 403 is formed on the leveling layer 404. The common electrode 403 comprises a material that is optically transparent and electrically conductive, for example, such as indium tin oxide (ITO), indium zinc oxide (IZO), etc.

Hereinbefore, a method of forming the color filter substrate 401 was explained. A method of forming the array substrate 100 was explained already.

The color filter substrate 401 and the array substrate 100 are bonded together by the sealant 408. The sealant 408 is formed along the sealine region SLR of FIG. 1, such that the sealant 408 surrounds the display region DR. A small portion of the sealant 408, however, is opened.

The sealant 408 makes contact with the gate insulation layer 305 or the first transparent substrate 304 via the opening window 301 formed at the insulation layer 306.

A spacer 514 maintains a distance between the array substrate 100 and the color filter substrate 401 that is bonded by the sealant 408. The spacer 514 is disposed over the contact hole 513. The black matrix 406 covers the spacer 514 to prevent the spacer 514 from being seen outside.

When the color filter substrate 401 is assembled with the array substrate 100, liquid crystals are injected into the space between the color substrate 401 and the array substrate 100 to form a liquid crystal layer.

FIGS. 8 to 11 are schematic views showing a process of injecting liquid crystals.

Figure 8:
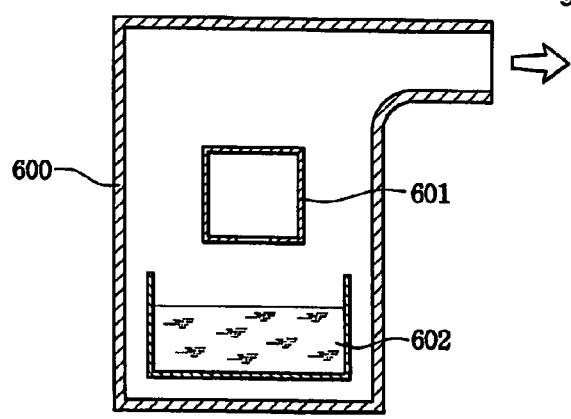
FIGS. 8 to 11 are schematic views showing a process of injecting liquid crystal.

Referring to FIG. 8, a bonded module 601 of the color filter substrate 401 and the array substrate 100 is loaded in a chamber 600.

Then, a pressure of the chamber 600 is lowered to be about $5 \times 10^{-3}$ Torr.

Figure 9:
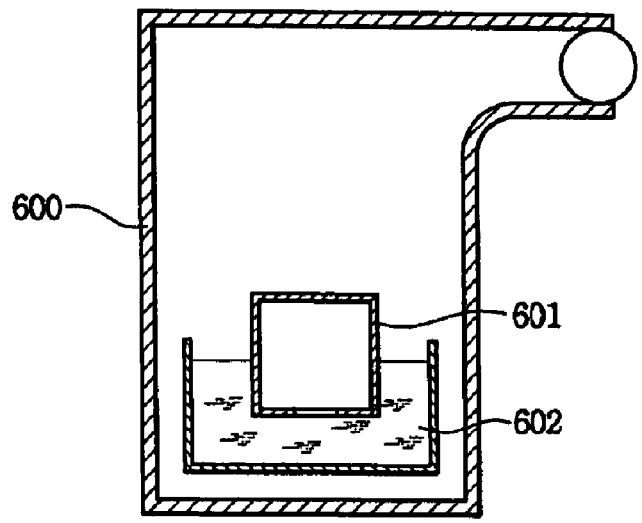

Referring to FIG. 9, the chamber 600 is closed, and the bonded module 601 of the color filter substrate 401 and the array substrate 100 is dipped into the liquid crystal material 602. A pressure of the space between the color filter substrate 401 and the array substrate 100 is the same as the pressure of the chamber. Thus, the liquid crystal material is not injected into the space between the color filter substrate 401 and the array substrate 100.

Figure 10:
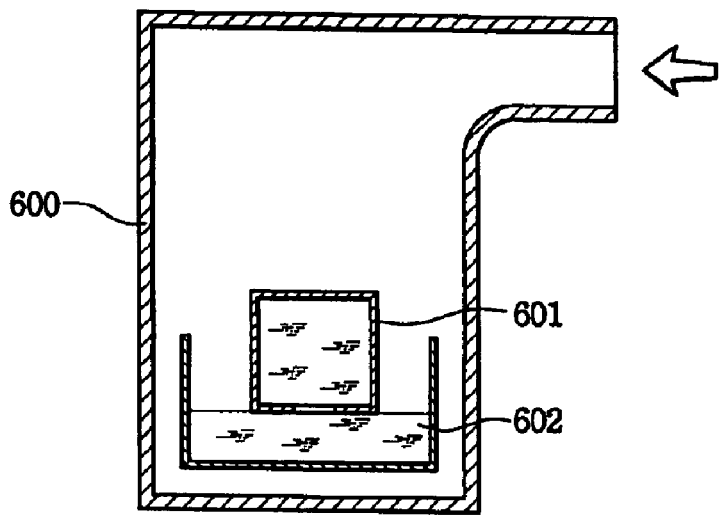
Figure 11:
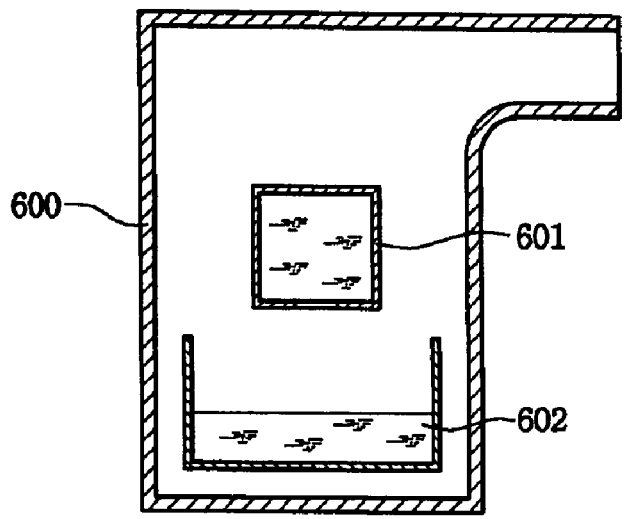

Referring to FIGS. 10 and 11, the chamber 600 is opened and the inert gas is injected into the chamber to raise the pressure of the chamber. Then, the pressure of the chamber is higher than the pressure of the space between the color filter substrate 401 and the array substrate 100. Therefore, the liquid crystal material 602 is injected into the space between the color filter substrate 401 and the array substrate 100.

According to a conventional liquid crystal display apparatus, cracks are formed between the sealant 408 and the insulation layer 306 or between the insulation layer 306 and the gate insulation layer 305. Therefore, the liquid crystal material is not injected into between the color filter substrate 401 and the array substrate 100 due to poor vacuum in bonded module 601.

However, according to the present invention, the bonding of the sealant 408 and the insulation layer 306 is reinforced to prevent the cracks between the sealant and the insulation layer. Therefore, the liquid crystal material 602 is completely filled.

INDUSTRIAL APPLICABILITY

According to the present invention, a bonding of a color filter substrate and an array substrate is reinforced.

Furthermore, liquid crystal material is completely filled in between the color filter substrate and the array substrate.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. An array substrate comprising:
a transparent substrate including a display region that displays an image, a peripheral region having a driving circuit for displaying an image through the display region, and a sealine region that surrounds the display region to define the display region and the peripheral region;
a first insulation layer formed over the transparent substrate, the first insulation layer having a first portion overlapped with the display region and a second portion overlapped with the sealine region and separated from the first portion by an opening window extending in a longitudinal direction of the sealine region;
a pixel electrode formed on the first insulation layer of the display region; and
a second insulation layer that is disposed between the first insulation layer and the transparent substrate, wherein the opening window extends through the first insulation layer to the second insulation layer,
wherein the second portion is disposed at an inside of the opening window on the second insulation layer.

2. The array substrate of claim 1, wherein the first insulation layer corresponds to an organic layer.

3. The array substrate of claim 1, wherein the second insulation layer corresponds to a silicon nitride layer (SiNx).

4. The array substrate of claim 1, further comprising a switching device having a gate electrode, a drain electrode that is electrically connected to the pixel electrode and a source electrode, a gate line that is electrically connected to the gate electrode, and a data line that is electrically connected to the source electrode, wherein a portion of the data line overlaps with the pixel electrode.

5. The liquid crystal display apparatus of claim 1 wherein a height of the second portion is substantially the same as a height of an interior edge of the window opening.

6. A liquid crystal display apparatus comprising:
an array substrate including:
a transparent substrate including a display region that displays an image, a peripheral region having a driving circuit for displaying an image through the display region, and a sealine region that surrounds the display region to define the display region and the peripheral region;
a first insulation layer formed over the transparent substrate, the first insulation layer having a first portion overlapped with the display region and a second portion overlapped with the sealine region and separated from the first portion by an opening window extending in a longitudinal direction of the sealine region;
a pixel electrode formed on the first insulation layer of the display region; and
a second insulation layer that is disposed between the first insulation layer and the transparent substrate, wherein the opening window extends through the first insulation layer to the second insulation layer,
wherein the second portion is disposed at an inside of the opening window on the second insulation layer;
a color filter substrate facing the array substrate;
a liquid crystal layer interposed between the array substrate and the color filter substrate; and
a sealing member formed at the opening window to bond the array substrate and the color filter substrate.

7. The liquid crystal display apparatus of claim 6, wherein the first insulation layer corresponds to an organic layer.

8. The liquid crystal display apparatus of claim 6, wherein the second insulation layer corresponds to a silicon nitride layer (SiNx).

9. The liquid crystal display apparatus of claim 6, further comprising a switching device having a gate electrode, a drain electrode that is electrically connected to the pixel electrode and a source electrode, a gate line that is electrically connected to the gate electrode, and a data line that is electrically connected to the source electrode, wherein a portion of the data line overlaps with the pixel electrode.

10. The liquid crystal display apparatus of claim 6, wherein the liquid crystal layer is injected between the array substrate and the color filter substrate by a vacuum injection method.

11. The liquid crystal display apparatus of claim 6 wherein a height of the second portion is substantially the same as a height of an interior edge of the window opening.

12. A method of forming an array substrate, comprising:
forming a second insulation layer on a transparent layer
forming a first insulation layer over the second insulation layer and the transparent substrate including a display region that displays an image, a peripheral region having a driving circuit for displaying an image through the display region, and a sealine region that surrounds the display region to define the display region and the peripheral region;
removing a portion of the first insulation layer to form an opening window in the sealine region so that the first insulation layer has a first portion overlapped with the display region and a second portion overlapped with the sealine region and separated from the first portion, the opening window extending through the first insulation layer to the second insulation layer and extending in a longitudinal direction of the sealine region, wherein the second portion is disposed at an inside of the opening window on the second insulation layer; and
forming a pixel electrode on the first insulation layer of the display region.

13. The method of claim 12, wherein the first insulation layer corresponds to an organic layer.

14. The method of claim 12, wherein the second insulation layer corresponds to a silicon nitride layer (SiNx).

15. The method of claim 12 wherein a height of the second portion is substantially the same as a height of an interior edge of the window opening.

16. A method of forming a liquid crystal display apparatus, comprising:
forming an array substrate including i) a transparent substrate including a display region that displays an image, a peripheral region having a driving circuit for displaying an image through the display region, and a sealine region that surrounds the display region to define the display region and the peripheral region, ii) a first insulation layer formed over the transparent substrate, the first insulation layer having a first portion overlapped with the display region and a second portion overlapped with the sealine region and separated from the first portion by an opening window in the sealine region, iii) a pixel electrode formed on the first insulation layer of the display region, and iv) a second insulation layer that is disposed between the first insulation layer and the transparent substrate, wherein the opening window extends through the first insulation layer to the second insulation layer and extends in a longitudinal direction of the sealine region, wherein the second portion is disposed at an inside of the opening window on the second insulation layer, and separated from the first insulation layer;

forming a sealing member at the opening window;

attaching a color filter substrate to the sealing member to assemble the array substrate to the color filter substrate; and forming a liquid crystal layer between the array substrate and the color filter substrate.

17. The method of claim 16, wherein the first insulation layer corresponds to an organic layer.

18. The method of claim 16, wherein the second insulation layer corresponds to a silicon nitride layer (SiNx).

19. The method of claim 16 wherein a height of the second portion is substantially the same as a height of an interior edge of the window opening.

20. An array substrate comprising:
   a transparent substrate including a display region that displays an image, a peripheral region having a driving circuit for displaying an image through the display region, and a sealine region that surrounds the display region to define the display region and the peripheral region;
   a first insulation layer formed over the transparent substrate, the first insulation layer having a first portion overlapped with the display region and a second portion overlapped with the sealine region and separated from the first portion by an opening window extending in a longitudinal direction of the sealine region;
   a pixel electrode formed on the first insulation layer of the display region; and
   a second insulation layer that is disposed between the first insulation layer and the transparent substrate,
   wherein the second portion is disposed at an inside of the opening window on the second insulation layer.

21. A liquid crystal display apparatus comprising:
   an array substrate including:
   a transparent substrate including a display region that displays an image, a peripheral region having a driving circuit for displaying an image through the display region, and a sealine region that surrounds the display region to define the display region and the peripheral region;
   a first insulation layer formed over the transparent substrate, the first insulation layer having a first portion overlapped with the display region and a second portion overlapped with the sealine region and separated from the first portion by an opening window extending in a longitudinal direction of the sealine region;
   a pixel electrode formed on the first insulation layer of the display region; and
   a second insulation layer that is disposed between the first insulation layer and the transparent substrate, wherein the second portion is disposed at an inside of the opening window on the second insulation layer;
   a color filter substrate facing the array substrate;
   a liquid crystal layer interposed between the array substrate and the color filter substrate; and
   a sealing member formed at the opening window to bond the array substrate and the color filter substrate.

* * * * *